United States Patent [19]

Gray

[11] 4,128,271
[45] Dec. 5, 1978

[54] RECONDITIONING PANEL FOR THE FLOORS OF PICK-UP TRUCK CARGO BOXES AND CARGO VANS

[76] Inventor: Rodger Gray, P.O. Box 1137, Hobbs, N. Mex. 88240

[21] Appl. No.: 819,459

[22] Filed: Jul. 27, 1977

[51] Int. Cl.² .............................................. B62D 32/00
[52] U.S. Cl. ................................... 296/39 R; 220/442
[58] Field of Search ................... 220/63 R; 296/39 R, 296/39 A, 31 P, 28 D

[56] References Cited

U.S. PATENT DOCUMENTS

| | | | |
|---|---|---|---|
| 2,898,146 | 8/1959 | Yudenfreund | 296/39 R |
| 3,578,375 | 5/1971 | Finefrock | 296/39 R |
| 3,814,473 | 6/1974 | Lorenzen, Jr. | 220/63 R |
| 3,881,768 | 5/1975 | Nix | 296/39 R |
| 3,962,066 | 6/1976 | Barber et al. | 220/63 R |
| 4,047,749 | 9/1977 | Lambitz | 296/39 R |

*Primary Examiner*—Richard A. Bertsch
*Attorney, Agent, or Firm*—D. Paul Weaver

[57] ABSTRACT

To restore the cosmetic appearance of the load box floor in a pick-up truck or cargo van, a prefabricated and prepunched metal reconditioning panel is placed over the existing damaged load floor and attached thereto with the same bolts used to secure the damaged floor to the vehicle frame. The punching of holes in the reconditioning panel creates small spacers between the installed panel and floor assisting in the dissipation of moisture without loss of strength. Downturned edge flanges on the reconditioning panel engage existing calked floor joints to form a weather-tight seal between the existing floor and panel when the panel is bolted down.

2 Claims, 5 Drawing Figures

RECONDITIONING PANEL FOR THE FLOORS OF PICK-UP TRUCK CARGO BOXES AND CARGO VANS

BACKGROUND OF THE INVENTION

The load sustaining floors of pick-up trucks and cargo vans are subject to much cosmetic damage over a period of time due to the nature of the cargo being hauled and the rough usage that these vehicles customarily encounter. The load floors gradually become dented and severely scratched and partly because of the ribbed floor configuration the floors are difficult and costly to repair. Repainting improves somewhat the appearance of the cargo floor but does not fully restore the marred surface of the metal so that the truck or van is not cosmetically pleasing.

In light of the above, there is a need for a practical economical means to recondition the damaged cargo floors of pick-up trucks and vans so that their original appearance will be substantially completely restored without in any way lessening the utility of the vehicle. Some broadly related proposals are present in the prior art but none is suitable to completely satisfy the stated need which the present invention seeks to completely satisfy in a very simple manner. Examples of the known patented prior art are contained in the following U.S. patents: U.S. Pat. Nos. 3,578,375, 3,814,473, 3,653,710, 3,912,325, 3,652,123, 3,942,239.

SUMMARY OF THE INVENTION

In essence, the invention is a preformed and prepunched ribbed metal reconditioning panel which fits accurately and snugly over the existing damaged cargo floor to restore the original appearance thereof. The reconditioning panel is bolted down with the same bolts that are used to secure the existing floor to the vehicle frame, the panel being prepunched to accept these bolts. The punching operation forms multiple small depending spacer elements on the reconditioning panel which maintain it slightly spaced from the underlying floor at least while unloaded to encourage the evaporation of moisture. Under cargo loading, the panel will deflect downwardly into solid contact with the floor for maximum strength which can exceed the strength of the original floor when new. Edge flanges on the reconditioning panel engage existing calked joints in the vehicle floor to form a weather-tight seal between the panel and floor on at least two sides of the panel. The reconditioning panel covers substantially the entire area of the existing cargo floor in either a pick-up truck or van.

DETAILED DESCRIPTION

Figure 1:
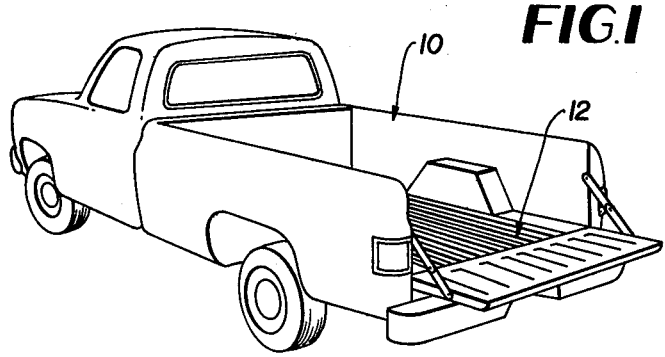
FIG. 1 is a perspective view of a pick-up truck equipped with the invention.
Figure 2:
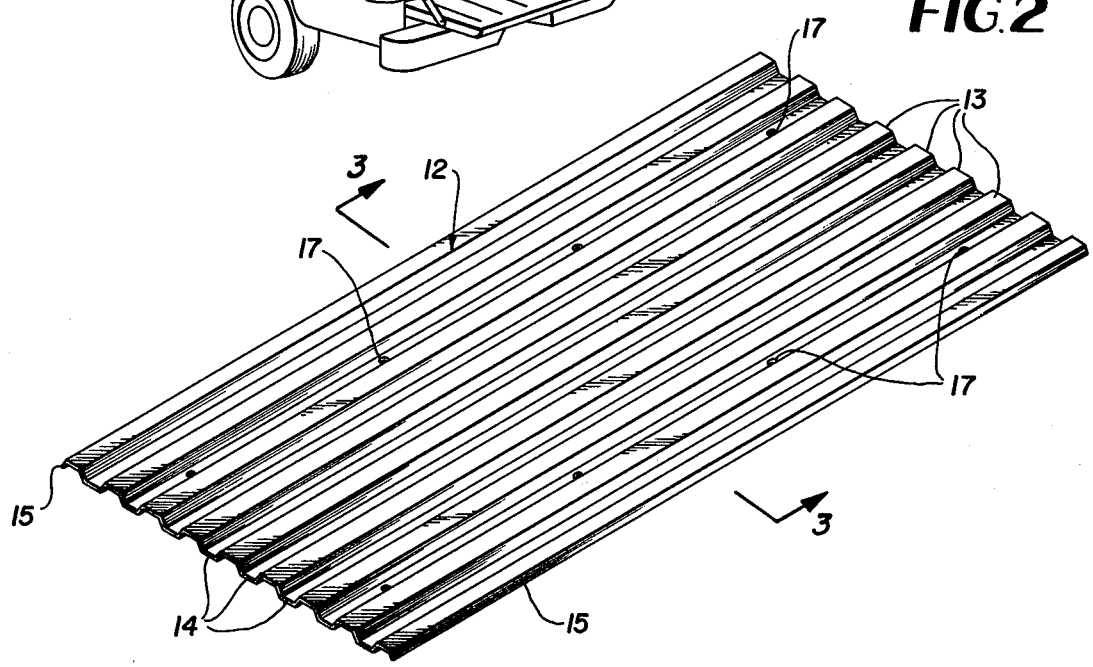
FIG. 2 is a perspective view on an enlarged scale of a metal reconditioning panel forming the main subject matter of the invention.

Referring to the drawings in detail wherein like numerals designate like parts, the numeral 10 designates a conventional pick-up truck which may be one of several known manufacturers. In this connection, the floor reconditioning panel forming the invention can be made with slight variations to properly fit all major makes of pick-up trucks and cargo vans.

As stated previously, the truck 10 or any comparable van, has an original cargo floor 11 which gradually becomes scarred and dented so as to resist satisfactory repairing by painting and other known methods without excessive cost. To deal with this problem, the present invention comprises a reconditioning panel 12 formed of cold rolled steel or galvanized steel which may be prepainted to exactly match the color of the vehicle on which it is being installed. Preferably, the metal employed in the panel 12 will be in the range of 0.018 to 0.060 inch thick. When properly installed, the reconditioning panel 12 will restore the cargo floor to a strength at least equal to and greater than its original strength while simultaneously restoring the cosmetic condition of the floor.

The reconditioning panel 12 is rectangular and is formed with a plurality of parallel longitudinal corrugations or ribs 13 and intervening valleys 14 which precisely match the cross sectional configuration of the existing floor 11, which is similarly ribbed, as shown in the drawings. The panel 12 is sized to cover substantially completely the surface area of the worn and damaged original cargo floor 11.

Figure 5:
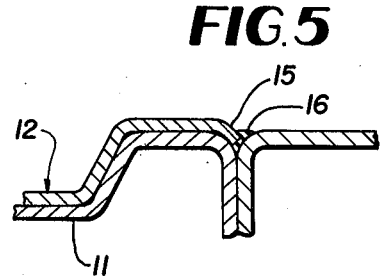
FIG. 5 is a similar cross section taken through the floor and panel at a calked floor joint.

At least along the two longitudinal edges of the panel 12, it is provided with short downturned flanges 15, see FIG. 5, which engage existing calked joints or seams 16 of the original floor structure of the vehicle. The arrangement forms a weather-tight seal along the flanged edges of the panel 12 when the panel is bolted down on the existing floor 11.

Figure 4:
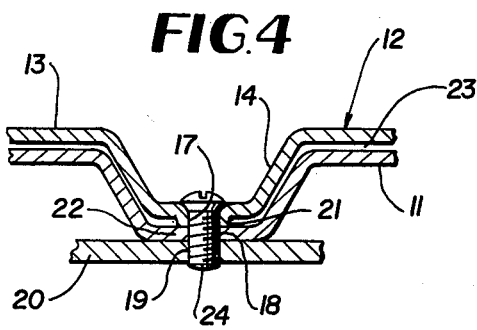
FIG. 4 is an enlarged fragmentary cross section taken through interfitting ribs and fastener means of an existing floor and reconditioning panel according to the invention.

The panel 12 is accurately prepunched to form spaced fastener installation apertures 17 which register with existing fastener receiving apertures 18 and 19, FIG. 4, in the existing floor 11 and underlying vehicle frame structure 20.

The punching operation producing the apertures 17 creates multiple short spaced depending spacer sleeves 21 integrally formed on the bottom surfaces of the panel 12 formed by the valleys 14. These spacer elements rest on the bottom walls 22 of the valleys of the original cargo floor 11 and maintain at these points a permanent slight spacing between the panel 12 and floor 11 to lessen the accumulation of moisture and promote drying to avoid rusting. This is an important feature of the invention contributing to a long and useful life for the reconditioned cargo floor by means of the invention.

Figure 3:
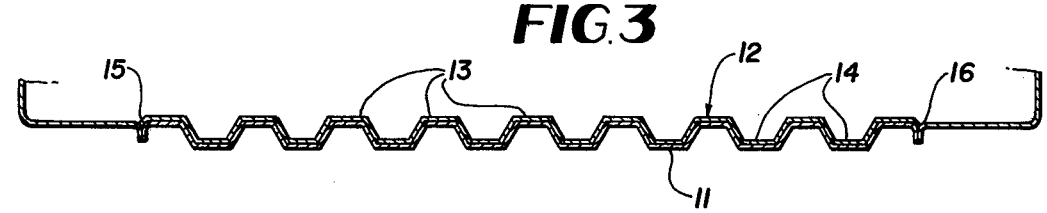
FIG. 3 is a small scale fragmentary transverse vertical section taken on line 3—3 of FIG. 2 through the cargo floor of a pick-up truck or van having the reconditioning panel forming the invention installed thereon.

When the panel 12 is loaded with cargo, the small gap 23 existing between the panel and floor over most of the floor area will close and the panel 12 will be in firm metal-to-metal contact with the floor 11 to impart maximum strength to the composite structure, as best shown in FIG. 3.

The reconditioning panel is secured in place by the original screws 24 or bolts which fastened the cargo floor 11 to the frame 20. These fasteners 23 can simply be removed and then reinserted when the panel 12 is laid over the cargo floor. When the fasteners are tightened, the flanges 15 will be drawn down into firm sealing engagement with the calking 16 and the entire panel 12 will be locked immovably to the existing floor.

The advantages of the invention for reconditioning vehicle cargo floors in a quick, safe, practical and economical manner should now be fully apparent. The invention restores the cargo floor substantially to a like-new condition.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a cargo carrying vehicle having a ribbed metallic cargo floor which is subject to denting and marring over a period of time, a reconditioning means for said cargo floor in the form of a metal panel which is sized and shaped to cover the existing cargo floor substantially completely, said panel being ribbed to mate with the ribbing of the existing floor when the panel is placed thereon, said panel being punched to form therethrough a plurality of spaced fastener receiving apertures adapted to register with like apertures of the existing floor, fastener elements engaging through the registering apertures in the panel and existing floor for anchoring both to an underlying vehicle frame part, plural spaced axially short depending annular spacer sleeves on the bottom face of said panel produced by the punching of the apertures and resting on the existing floor and maintaining the panel slightly spaced from the existing floor at least in the regions of the spacer sleeves while allowing the other areas of the panel to deflect under loading into supportive contact with the existing floor, and downturned flanges formed on the panel at least along the longitudinal edges thereof, said flanges sealingly engaging calked seams in the existing cargo floor structure of the vehicle to thereby render the reconditioning panel substantially weather-proof.

2. In a cargo carrying vehicle as defined in claim 1, and said spacer elements of the panel disposed at the bottoms of valleys formed between the ribs of the panel, the ribs being unperforated.

* * * * *